Patented June 13, 1933

1,913,487

UNITED STATES PATENT OFFICE

WILHELM IRION AND HERBERT MAHN, OF DESSAU IN ANHALT, GERMANY, ASSIGNORS TO I. G. FARBENINDUSTRIE AKTIENGESELLSCHAFT, OF FRANKFORT-ON-THE-MAIN, GERMANY

SOLUTION OF SILK FIBROIN AND THE WASTES THEREOF

No Drawing. Application filed April 21, 1931, Serial No. 531,850, and in Germany April 29, 1930.

Our present invention relates to a new process of manufacturing an aqueous solution of a protein and more particularly of fibroin as contained in natural silk. It is known to disperse proteins in solutions of hydrated or dispersive salts, for instance, to dissolve silk in solutions of LiBr, NaSCN, NaI or LiSCN.

From these solutions of fibroin water-insoluble masses of fibroin may be precipitated by adding aggregating salts or other compounds showing a similar action such as alcohol, these masses being plastic, so that artificial fibers may be produced therefrom. A separation of a fibroin containing mass likewise occurs when cooling a fibroin solution prepared in a hot solution of a dispersive salt.

Now we have found that the last mentioned products are adsorption compounds of salt and fibroin which surprisingly are easily soluble in water without addition of a further quantity of a dispersive salt, aqueous solutions of fibroin being obtainable in this manner which contain a relatively small amount of salt.

Furthermore, we have found new and advantageous methods of preparing the said adsorption products containing protein or more particularly fibroin and the said dispersive salts, and to provide with the aid of these adsorption compounds aqueous solutions of fibroin poor in salt. The advantage of our new methods resides in the use of a temperature lower than that applied in the known processes, whereby a far reaching degradation of the fibroin molecule is avoided.

Preferably, these adsorption compounds are produced by introducing silk into a highly concentrated salt solution, such as a solution of lithium bromide, sodium thiocyanate, sodium iodide, calcium thiocyanate. When agitating natural silk in the salt solution and when allowing the mass to stand for some time, the adsorption compound is formed already at a moderate temperature ranging between ordinary temperature (18–22° C.) and about 45° C. varying with the salt contained in the solution. The adsorption compound then separates from the solution in the form of a tough paste.

This paste can, however, also be prepared by kneading the silk with a dispersive salt and a small quantity of water until the mass becomes plastic.

Furthermore, it is possible to dissolve the silk first in a solution of a dispersive salt and then to precipitate the adsorption compound by addition of further quantities of the same salt, either in the form of solid salt or as a highly concentrated solution.

In order to avoid a degradation of the fibroin, it is advantageous to work at a temperature as low as possible. Preferably, temperatures of about 20° C. to about 30° C. or somewhat raised temperatures are maintained, not exceeding, however, 80° C. When working at a raised temperature, the fibroin is subjected to this treatment for a time as short as possible.

The natural silk, preferably, is degummed before being treated in the manner described; small residues of sericin, however, in an amount of 2 to 5% do not prevent the carrying out of the process.

The quantity of salt adsorbed by the fibroin varies with the different salts and the peculiar conditions maintained during the treatment with the salt solutions. Generally, the separated mass contains 33 to 25% of fibroin, the balance being salt.

The adsorption compounds obtainable according to one of the processes mentioned above, may be redissolved in a very limited quantity of water in order to be worked up. 10 parts of water or less are sufficient to yield a clear solution. On account of the small amount of salt contained in these final solutions, the latter are very well suited to be freed completely or nearly completely from salt by dialysis. These solutions containing, if at all, only a small amount of salt, may be used in the known manner to produce artificial articles, such as fibers, films or plastic masses.

The following examples illustrate the invention:—

*Example 1.*—5 grams of degummed silk are introduced into 50 grams of an aqueous solution of lithium bromide of 60% strength at a temperature of 20° C. In the course of several hours the silk is transformed into the adsorption compound of fibroin and lithium bromide, which floats on the solution and is then separated from the excess of the lithium bromide solution and pressed off. It contains fibroin and lithium bromide approximately in the ratio 1:1.35. The pressed mass may then directly be utilized for the preparation of solutions which can be made into films or threads or any other articles.

*Example 2.*—Into 3 kilos of a solution of NaSCN saturated at 50° C. there are introduced at 45° C. 50 grams of natural silk, for instance, in form of uncombed flock silk and allowed to remain therein for about 20 minutes while well kneading. The paste formed containing fibroin and sodium thiocyanate in the ratio 1:4, is skimmed and used for the preparation of solutions.

*Example 3.*—100 grams of natural silk wastes (blouses) are introduced at about 45° C. into about 4 kilos of a solution of NaSCN saturated at 50° C. and the whole is allowed to stand for 30 minutes while well kneading. The paste which forms contains fibroin and salt in the ratio 1:4; it is eliminated and dissolved, for instance, in 10 parts of cold water.

*Example 4.*—10 grams of degummed natural silk are well kneaded in a kneader at ordinary temperature with 25 grams of solid lithium bromide, to which 10-20 grams of water have been added. The plastic mass thus produced is then dissolved in water.

*Example 5.*—10 grams of degummed natural silk are introduced into 100 grams of a 48% lithium bromide solution at 20° C. As soon as the silk is dissolved another 200 grams of a 60% lithium bromide solution are added, whereupon after some time the adsorption compound of fibroin and lithium bromide separates on the surface of the solution. It is separated, pressed off and dissolved in water.

The adsorption product is only formed in the concentrated salt solutions; from a dilute solution solid salt-fibroin compounds do not separate. In the case of lithium bromide a solution having a concentration of at least 48% is necessary to disperse the fibroin at 20–30° C., while a 55% solution is required for separating the adsorption product. In the case of sodium thiocyanate, a solution of 64% strength disperses the fibroin and separates the mass at about 45° C.

What we claim is:—

1. In the manufacture of aqueous solutions of fibroin the steps which comprise acting upon degummed natural silk with a highly concentrated solution selected from a salt of the group consisting of lithium bromide, sodium iodide, sodium thiocyanate and calcium thiocyanate, at a temperature not exceeding 80° C., separating the adsorption product formed and dissolving the latter in water.

2. In the manufacture of aqueous solutions of fibroin the steps which comprise treating the degummed silk with a solution of lithium bromide of 60% strength at a temperature of 20° C., separating the adsorption product formed and dissolving the latter in water.

3. In the manufacture of aqueous solutions of fibroin the steps which comprise treating the degummed silk at a temperature of about 45° C. with an aqueous solution of sodium thiocyanate saturated at 50° C., separating the adsorption product formed and dissolving the latter in water.

4. In the manufacture of aqueous solutions of fibroin the steps which comprise acting upon degummed natural silk with a salt selected from the group consisting of lithium bromide, sodium iodide, sodium thiocyanate and calcium thiocyanate, and a small quantity of a solvent for these salts, at a temperature not exceeding 80° C., separating the adsorption product formed and dissolving the latter in water.

5. In the manufacture of aqueous solutions of fibroin the steps which comprise kneading 10 parts by weight of degummed natural silk at ordinary temperature with 25 parts of lithium bromide and 10 to 20 parts by weight of water and dissolving the plastic mass produced in water.

In testimony whereof, we affix our signatures.

WILHELM IRION.
HERBERT MAHN.